(12) United States Patent
Makeev et al.

(10) Patent No.: US 7,865,397 B2
(45) Date of Patent: Jan. 4, 2011

(54) CATEGORY-BASED ADVERTISEMENT

(75) Inventors: Evgeniy Makeev, Cupertino, CA (US); Lou Sheward, Half Moon Bay, CA (US); Yoram Talmor, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 812 days.

(21) Appl. No.: 11/762,502

(22) Filed: Jun. 13, 2007

(65) Prior Publication Data

US 2008/0313030 A1 Dec. 18, 2008

(51) Int. Cl.
G06Q 30/00 (2006.01)
(52) U.S. Cl. .................................. 705/14.71; 705/14.73
(58) Field of Classification Search ............... 705/14.73, 705/14.43, 14.49, 14.54, 14.55, 14.71; 707/2, 707/3
See application file for complete search history.

(56) References Cited

U.S. PATENT DOCUMENTS

| | | | |
|---|---|---|---|
| 7,181,438 B1 * | 2/2007 | Szabo ............................. | 1/1 |
| 7,194,477 B1 * | 3/2007 | Bradley et al. ................. | 1/1 |
| 7,644,121 B2 * | 1/2010 | Swanson et al. ............ | 709/203 |
| 7,660,581 B2 * | 2/2010 | Ramer et al. ............ | 455/432.3 |
| 7,660,737 B1 * | 2/2010 | Lim et al. ................. | 705/14.49 |
| 7,783,249 B2 * | 8/2010 | Robinson ................... | 455/3.06 |
| 2004/0015397 A1 * | 1/2004 | Barry et al. ................... | 705/14 |
| 2008/0097837 A1 * | 4/2008 | Jacobson ....................... | 705/14 |
| 2008/0103883 A1 * | 5/2008 | Szybalski et al. .............. | 705/14 |
| 2008/0103886 A1 * | 5/2008 | Li et al. .......................... | 705/14 |
| 2008/0103887 A1 * | 5/2008 | Oldham et al. ................. | 705/14 |
| 2008/0103893 A1 * | 5/2008 | Nagarajan et al. ............. | 705/14 |
| 2008/0114644 A1 * | 5/2008 | Frank et al. .................... | 705/14 |
| 2008/0126192 A1 * | 5/2008 | Patel et al. ..................... | 705/14 |
| 2008/0147493 A1 * | 6/2008 | Aarnio et al. .................. | 705/14 |
| 2008/0195458 A1 * | 8/2008 | Anschutz et al. .............. | 705/10 |
| 2008/0235083 A2 * | 9/2008 | Bosarge et al. ................ | 705/14 |
| 2008/0313030 A1 * | 12/2008 | Makeev et al. ................ | 705/14 |

OTHER PUBLICATIONS

"Rules to Remember when joining the clubs"; Computer Retail Week, p. 72; May 23, 1994; ISSN 1066-7598.*

* cited by examiner

*Primary Examiner*—John G Weiss
*Assistant Examiner*—Adam Chornesky
(74) *Attorney, Agent, or Firm*—Stattler-Suh PC

(57) ABSTRACT

A hierarchical category system for organizing and displaying electronic advertisements is disclosed. Each electronic advertisement is assigned one or more categories from a hierarchical categorization system. Similarly, each available advertisement placement location is also provided with a category from the hierarchical categorization, system. Then, when displaying advertisements, the system attempts to locate advertisements that have matching categorizations. When no matching advertisement with an exact matching categorization can be found, the system will attempt to locate an advertisement from a more specific (child) category that is a sub category of the current category. However, the advertisement from the more specific (child) category must specify the broader category within its own allowable fall-back path.

15 Claims, 9 Drawing Sheets

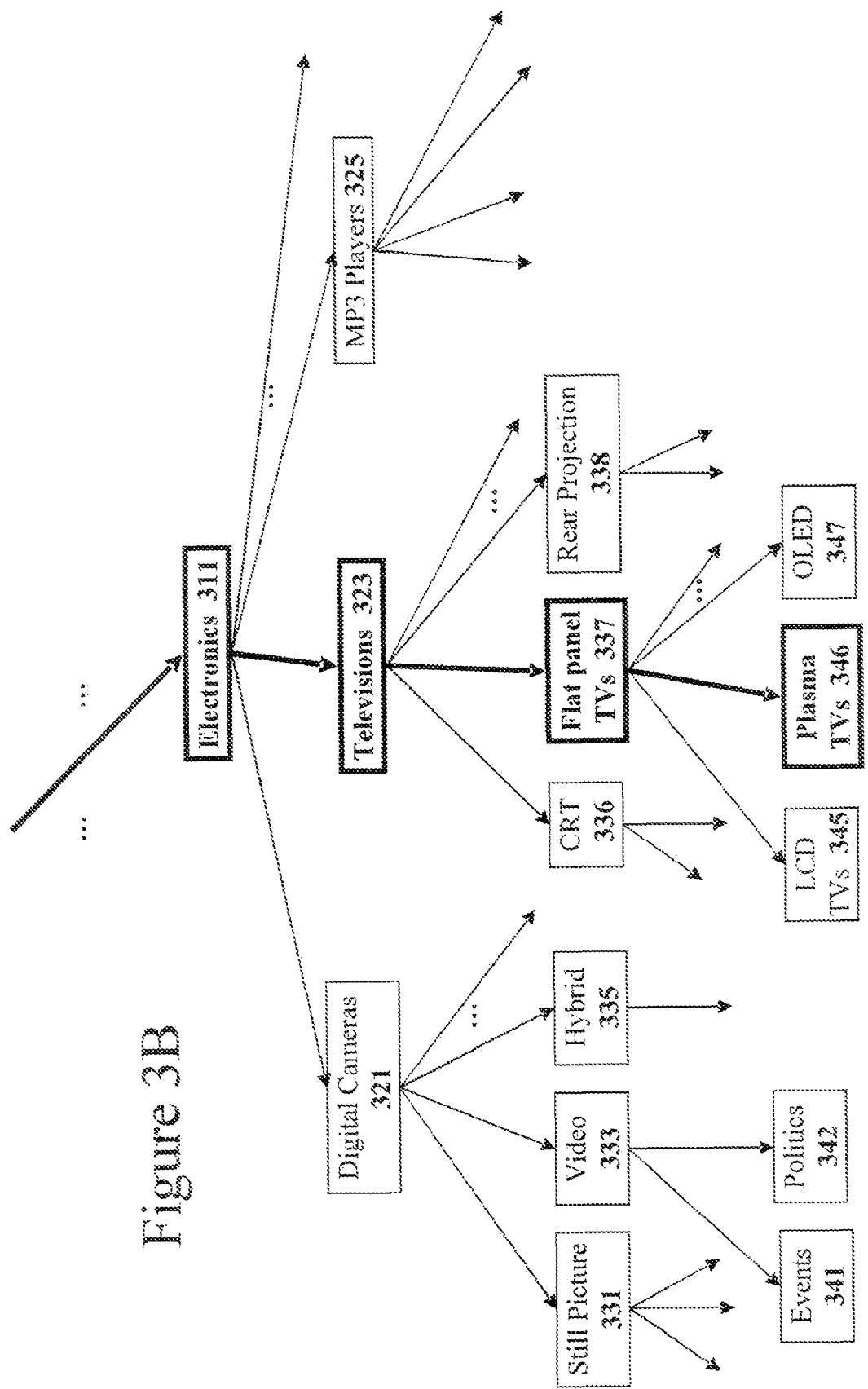

US 7,865,397 B2

CATEGORY-BASED ADVERTISEMENT

FIELD OF THE INVENTION

The present invention relates to the field of internet advertising. In particular the present invention discloses techniques for categorizing, selecting, and displaying internet advertisements.

BACKGROUND OF THE INVENTION

The global internet is a mass media on par with radio and television. And just like radio and television broadcasting, the content on the Internet is largely supported by advertising, fees. The main advertising supported portion of the Internet is the "World Wide Web" that displays HyperText Mark-Up Language (HTML) documents distributed using the HyperText Transport Protocol (HTTP). However, many other types of internet content and applications are advertising supported as well such as email, internet telephony, and internet video content.

Two of the most common types of advertisements on the World Wide Web portion of the Internet are banner advertisements and text link advertisements. Banner advertisements are generally images or animations that are displayed within an Internet web page. Text link advertisements are generally short segments of text that are linked to the advertiser's web site. With either banner advertisements or text link advertisements, the internet advertisement viewer may select the advertisement in order to be re-directed to a web site designated by the advertiser.

Most major interact advertisement systems currently operate using keyword-based methods of internet advertisement selection and placement. Specifically, internet advertisers select particular keywords to be associated with their internet advertisements. Then, when a web viewer enters a particular keyword into a search engine or an advertising-supported web page contains prominent usage of that particular keyword, then internet advertisements that have been designated to be associated with that keyword will be displayed.

While keyword based internet advertisement selection systems provide some advertisement relevance, a keyword-only based system is very limited in its ability to create a comprehensive advertisement/click market. Thus, it would be desirable to expand beyond the current keyword-based internet advertisement systems in order to improve the selection of relevant internet advertisements and create a more comprehensive interact advertising system.

SUMMARY OF THE INVENTION

The present invention introduces methods for organizing and displaying electronic advertisements. Each electronic advertisement is assigned one or more categories from a hierarchical categorization system. Similarly, each available advertisement placement location is also provided with a category from the hierarchical categorization system. Then, when displaying advertisements, the system attempts to locate advertisements that have matching categorizations.

When no matching advertisement with an exact matching categorization can be found., the system will attempt to locate an advertisement from a more specific (child) category that is a sub category of the current category. However, the advertisement from the more specific (child) category must specify the broader category within its own allowable fall-back path.

Other objects, features, and advantages of present invention will be apparent from the accompanying drawings and from the following detailed description.

BRIEF DESCRIPTION OF THE DRAWINGS

The objects, features, and advantages of the present invention will be apparent to one skilled in the art, in view of the following detailed description in which:

FIG. 3B illustrates the category hierarchy sub-section illustrated of FIG. 3A with the desired plasma. TV category node and a fail-back path high-lighted.

DETAILED DESCRIPTION

Methods for organizing and displaying internet advertisements are disclosed. In the following description, for purposes of explanation, specific nomenclature is set forth to provide a thorough understanding of the present invention. However, it will be apparent to one skilled in the art that these specific details are not required in order to practice the present invention. Furthermore, although the present invention is mainly disclosed with reference to advertisement on the World Wide Web aspect of the interact, the same techniques can easily be applied to any other type of electronic advertising channel that selects advertisements to be displayed in conjunction with advertising supported content.

Keyword-based Advertising for Commercial World Wide Web Sites

The World Wide Web portion of the global internet has become a very-popular mass media system. As with other mass media such as radio and television, the World Wide Web largely operates with content filled web sites or service web sites that are supported by advertising. Specifically, web site publishers provide interesting content or a useful service that attracts web site viewers and the web site publishers intersperse paid advertisements into the various web pages of the web site. The fees from the internet advertisers compensate the web site publishers for the web site hosting costs and the costs of creating the interesting content or useful service that attracts the web viewers.

Some internet web site advertisements are 'banner advertisements' consisting of an advertiser-supplied image or animation. Other internet web site advertisements merely consist of simple short strings of text. However, one thing that almost all internet web site advertisements have in common is that each internet advertisement contains a hyperlink (link) to an advertiser designated web site. In this manner, a person viewing an internet advertisement may click on the internet advertisement in order to be directed to the advertiser's designated web site to obtain more information on the advertiser's product or services.

Figure 1:
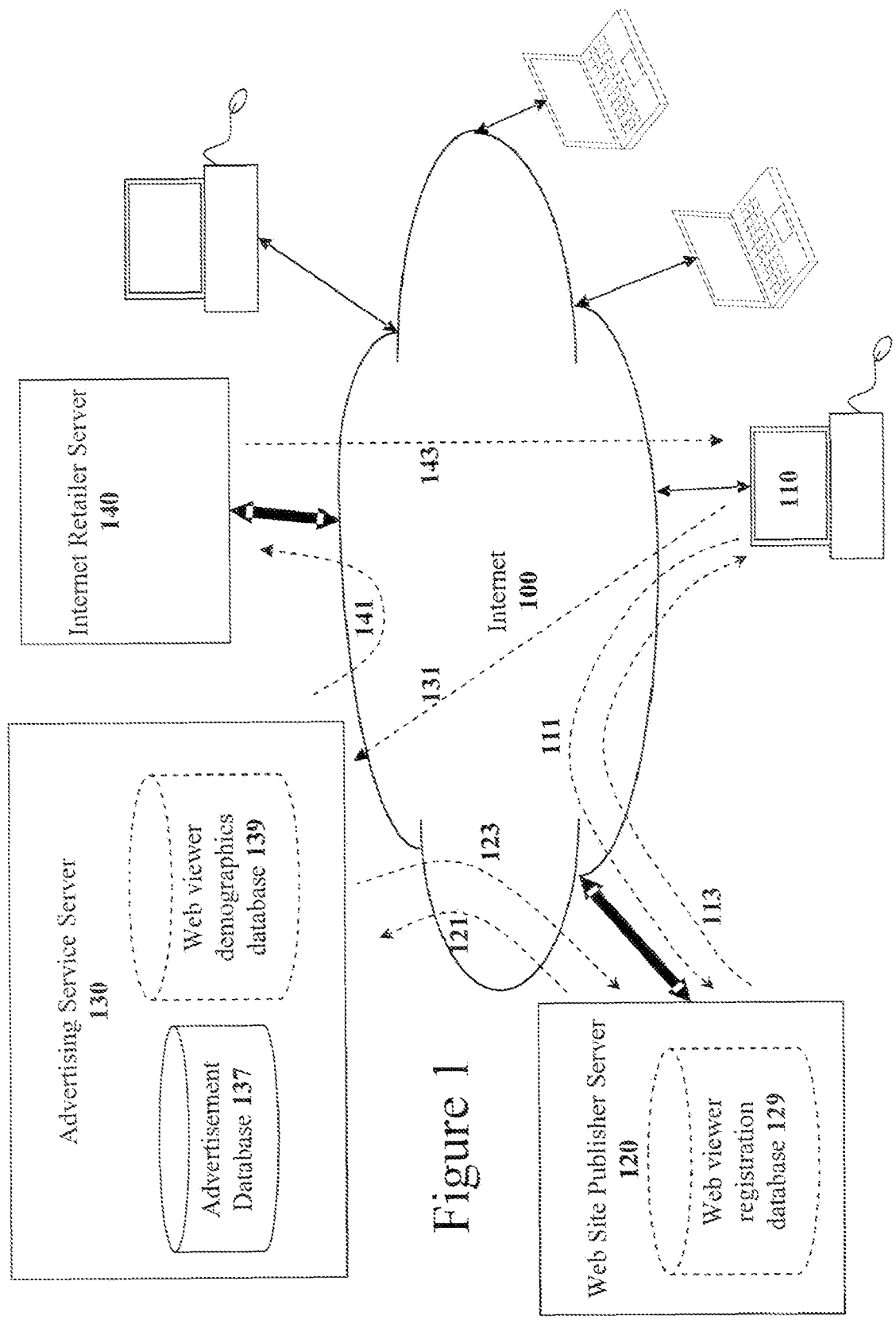
FIG. 1 illustrates a conceptual diagram of a user at a personal computer system accessing a web site server on the Internet that is supported by an advertising service.

The internet advertisements displayed within an advertisement-supported web site are often provided to a commercial web site publisher by an external internet advertising service. FIG. 1 illustrates conceptual diagram of how an external internet advertising service and a commercial web site publisher may operate together to display web pages with user desired content supplemented with internet advertisements.

Referring to FIG. 1, an internet based retailer server 140 that sells products to internet users may wish to seek additional customers. Thus, that internet based retailer may sign up with an internet advertisement service 130 in order to promote the web site 140 of the internet based retailer. The internet advertisement service 130 will handle the display of internet advertisements by attempting to have the advertisements displayed within web sites that have web viewers who may be interested in the products sold by the internet based retailer.

One method of achieving this goal is to associate the internet advertisements with one or more keywords that are relevant to the products offered, by the internet based retailer server 140. Then, when a web viewer enters one of the associated keywords into a internet search engine or when a web page that contains prominent usage of one or more of the associated keywords will be displayed, then the internet retailer's advertisements may be displayed on that web page.

For example, the web site served by web site publisher server 120 may provide internet search capabilities. When an internet user at personal computer requests an internet search using a set of designated search keywords on web site publisher server 120 (along request communication 111), web site publisher server 120 may request an advertisement from internet advertisement server 130 (along request 121). The internet advertisement request 121 may be accompanied by the user's search keywords in order to help select a relevant advertisement. In a similar manner, a web site that publishers content may provide a URL to the web site to the internet advertisement server 130 such that the internet advertisement server 130 can scan the site for a set of keywords that describe the web site.

Upon receiving the internet advertisement request 121. Internet advertisement server 130 would then search its internet advertisement database 137 to locate an advertisement associated with the keywords (such an advertisement for interact retailer 140) and return the selected advertisement to web site publisher server 120 (along response 123). The web site publisher server 120 will then deliver a web page having the results of the internet search along with the selected advertisement along response 113. In this manner, the user at personal computer 110 is exposed to Interact advertisements associated with the keywords entered such as the internet retailer server 140.

If the internet user at personal computer 110 is sufficiently interested in what is presented within a displayed internet advertisement then the internet user may click on the advertisement such that the internet user will be re-directed to the internet retailer server 140. The internet user will be re-directed to the internet retailer server 140 through an advertising service server 130 that will record the internet user's selection of the advertisement in order to bill the advertiser for the selection of the advertisement. Once the internet user has been re-directed to the internet retailer server 140, the internet user at personal computer 110 may purchase goods or services directly from the internet retailer server 140.

In the keyword-based internet advertising system described above, there is no 'fall-back' position if a match cannot be found for a particular keyword. If there is no advertisement for the keywords, then the internet advertising service server 130 may simply select some advertisements at random. Furthermore, a keyword based system is subject to some manipulation and gaming by the internet advertisers. For example, in an auction-based system, internet advertisers may bid for common misspellings of keywords instead of the actual desired keywords. Furthermore, advertisers may bid for a plethora of synonyms of desired keywords in order to obtain a low price for desired customers.

Category-Based Internet Advertising Introduction

To create a better-functioning internet advertisement system, the present invention proposes a move away from a keyword-based system toward a hierarchical category based internet advertising system. With a hierarchical category based internet advertising system, advertisers buy advertising not by keywords but Instead by areas on a well-defined hierarchical category system. With a well-defined hierarchical category system, there will be a natural fall-back position when the exact type of match is not available. Furthermore, some types of market manipulation and gaming currently occurring in the keyword based system cannot occur in a hierarchical category based internet advertising system.

An initial overview of a hierarchical, category based internet advertising system will be presented in this section. Later sections will provide details on various advantages of and techniques that may be used in a hierarchical category based internet advertising system.

Hierarchical Category Based Advertising Overview

Figure 2:
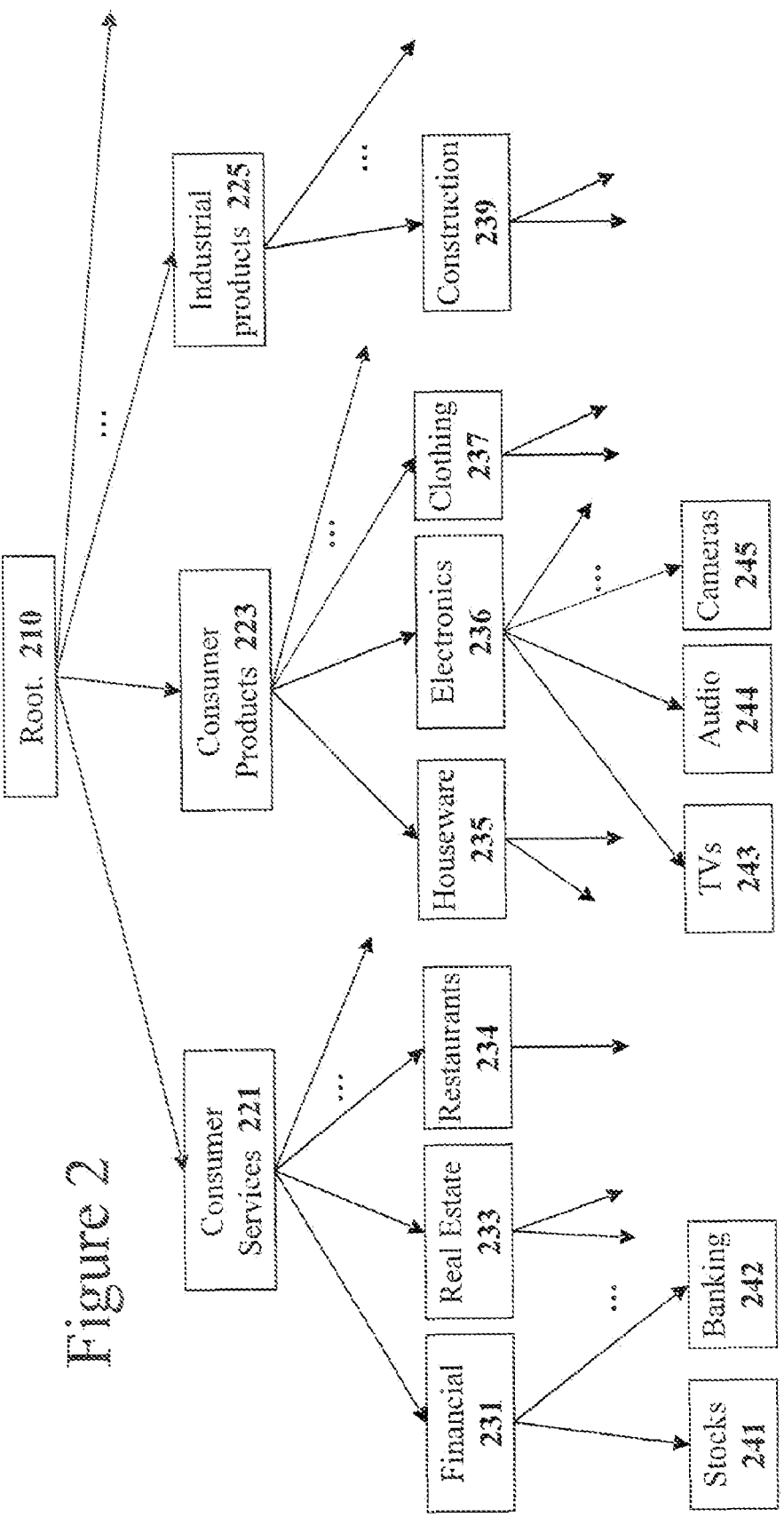
FIG. 2 illustrates a portion of one possible category hierarchy for a hierarchical category based internet advertising system.

FIG. 2 illustrates a subset of an example hierarchical categorization system that may be used to categorize various advertisements. The very top of the hierarchy is a root node 210 that encompasses all of the categories. Below the root node 210 is a set of very high-level categorizations for categorizing advertisements. In the example hierarchy of FIG. 2, the very high-level categorizations include consumer services 221, consumer products 223, industrial products 225, and additional high-level categorizations (not shown). Each very high level categorization is then further broken down into more specific categories. For example, the consumer products categorization includes housewares 235, electronics 226, clothing 237, and additional subcategories. Each category in the hierarchy is further broken down until very specific categories are reached.

Figure 3A:
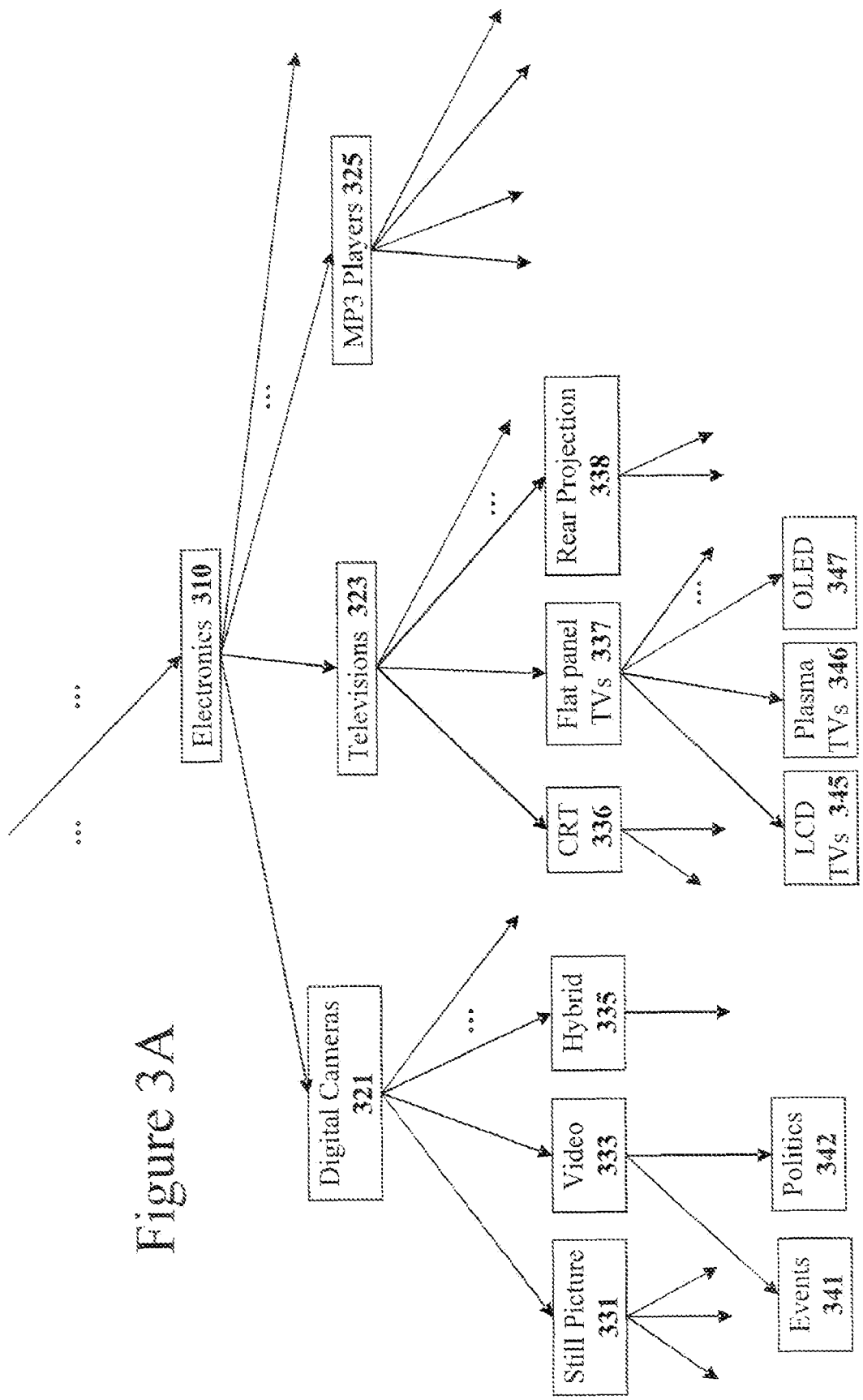
FIG. 3A illustrates a sub-section of the category hierarchy illustrated in FIG. 2.

With the hierarchical category based internet advertising system, each advertisement is associated with one or more category nodes and a possible fall-back path up the hierarchy categorization tree to more general categories. This is best presented with the use of an example. FIG. 3A illustrates a portion of a category hierarchy with electronics 310 as the most general node. If an internet retailer specializing in plasma televisions wishes to advertise its wares, the most logical categorization in FIG. 3 would be the plasma television 346 category node.

Fall-Back Path Offered by the Hierarchical Category

In addition to people specifically looking for plasma televisions, a plasma television retailer would be wise to advertise to additional potential customers that have not yet totally narrowed down their particular television requirements. The hierarchical category based internet advertising system of the present invention provides a logical method of handling such advertising. Specifically, a fall-back path that extents up the category hierarchy can be used as a fall-back path. Thus, a fall-back path for the plasma TV 337 category could include the broader categories flat panel TVs 337, the television 323 category, the electronics 311 category, and so on up the category hierarchy. This fall-back path is illustrated in FIG. 3B.

Note that the categories up the fall-back path provide more generalized categories that always include the original selected category slot.

The use of the fall-back is best presented using some examples. When an advertisement placement location categorized for the plasma TV 337 category slot becomes available, the plasma television retailer's advertisement would be displayed in that available plasma TV 337 category slot. However, when a category node further up the fall-back path is available (and there are no other better advertisement matches) then the plasma television retailer's advertisements may be displayed in a category node further up the fall-back path. For example if an electronics 311 category slot or a flat panel TVs 337 category slot becomes available, then the plasma television retailer advertisement may be placed in those category slots.

In a pay-per-click system wherein advertisers only pay for advertisements when a web viewer clicks on the advertisement, there are special considerations. Specifically, web viewer clicks from advertisements placed in a fall-back category slot should cost no more (and probably less) than an advertisement placed in the desired target category slots. The reason for this is that the web viewer clicks are judged to be of & "higher quality" for that particular advertiser. For example, when a web viewer clicks on a plasma television retailer's advertisement when it is displayed in a plasma television category slot, it is known that the web viewer was interested in plasma televisions. However, when a web viewer clicks on a plasma television retailer's advertisement when it is displayed in an electronics category slot the web viewer may not have been very interested in plasma televisions and may have clicked the advertisement out of curiosity (or by mistake). Thus, web viewer clicks in fall-back path categories should cost no more (and probably less) than web viewer clicks in the desired target category.

Figure 3C:
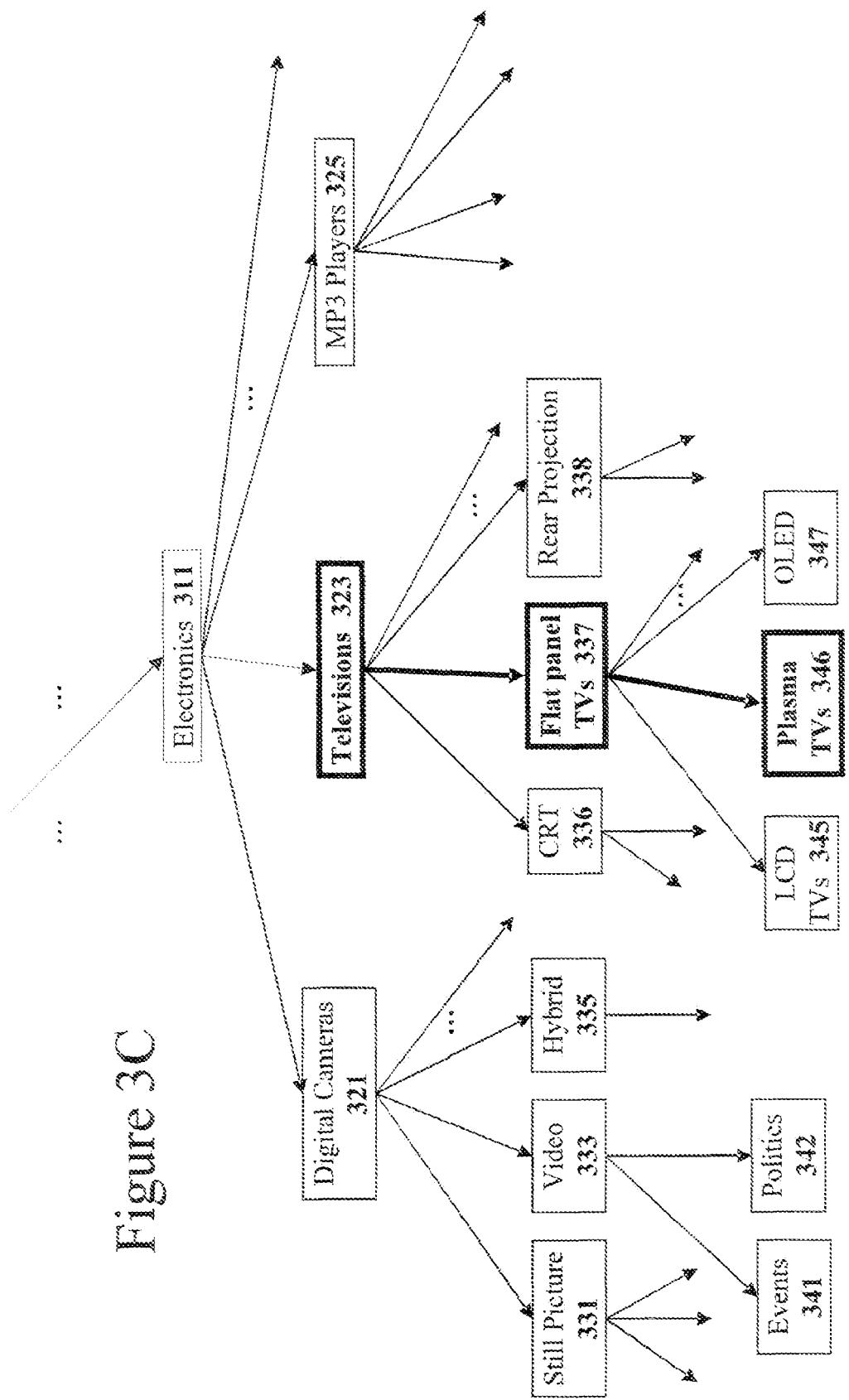
FIG. 3C illustrates the category hierarchy sub-section illustrated of FIG. 3B with the fail-back path limited to stop at 'televisions'.

To reduce extremely tenuous connections, the fall-back path may be limited by the advertiser. For example, FIG. 3C illustrates the category hierarchy of FIG. 3B wherein the fall-back path has been truncated at the televisions 323 category slot. In this manner, the plasma television retailer's advertisement would only be displayed to web viewers interested in plasma televisions 346, flat panel TVs 337, or television 323. Thus, a web viewer interested in audio equipment that was on a site categorized as electronics 311 would not be displayed the plasma television retailer's advertisement.

As a general rule, only advertisements from category that matches the category of an available advertisement slot or an advertisement from more specific (child) category will be used. However, if there are no matching advertisements available and no advertisements from a more specific category have the current category in their fall-back path, then an advertisement from a broader (parent) category may be used to fill the available advertisement slot if the advertiser who provided the advertisement opted to allow the advertisement to be used as a fill in for more specific categories.

Creation of Category-Based Internet Advertisements

It is probably easier to trade stocks and bonds on the internet these days than it is to create and have internet advertisements published. The whole existence of 'internet middle men' such as internet focused marketing companies is a testament to the lack of simplicity in current internet advertising systems. Thus, one goal of the hierarchical category based internet advertising system is to simplify the procedure for a potential advertiser that may want to advertise on the internet.

To achieve simplification goal, one can utilize natural abilities of potential advertisers to understand their own business and to be able to provide a good definition/description of the products and/or services they wish to advertise. Most other requirements using an internet advertising services are a nuisance and should be eliminated.

To simplify the system, the potential advertisers are presented with different options such that the each potential advertiser may select the procedure that is best for their needs. Below are three different systems that an advertiser may use to participate with the hierarchical category based internet advertising system of the present invention. However, many additional methods may be created.

Self Categorization

Potential advertisers know their own businesses better than anyone else such that these potential advertisers may wish to make their own category selections. Category selections will often follow direct connections such as an automobile tire shop advertising in an automobile tire category. Advertisers may also make indirect connections. For example, a financial services provider may wish to advertise in a golf vacation, category assuming that golf vacationers have money to invest.

Use Existing 'Creative & Titles' System

With current keyword based advertising systems, advertisers must submit a pair of "Creatives & Titles" for their advertisement. The Title is a main title headline that will be displayed when the internet advertisement appears. The Creative is a short string of text that is displayed along with the title to provide further information on the advertised good or service. The Creative & Title is often followed by the website address. For example the following illustrates a short internet advertisement that may appear as a result for a sponsored search:

| The Internet ad: | |
|---|---|
| Title: | Car Parts at Low Prices |
| Creative: | An incredible wide variety of car parts at low discount prices. |
| Web site address: | www.JoesDiscountAutoParts.com |

A categorization engine could be used to examine the Creatives & Titles for existing advertisements (or new advertisements) in order to automatically categorize the advertisement. One embodiment of a categorization engine would identify keywords and use a Bayesian classifier to categorize the advertisements. For example, in the Creatives & Titles example above, a classifier could identify the 'car' and 'parts' words and categorized the advertisement as car parts.

Automatic Categorization Based on Advertiser's Web Site

Even if an advertiser wants to do virtually no work with starting an internet advertising campaign, the hierarchical category based internet advertising system can be used. Specifically, a potential advertiser could simply submit a Uniform Resource Locator (URL) of their web site and let a categorization engine automatically categorize the potential advertiser's businesses. The categorization engine would crawl the potential advertiser's web site, extract features, and then categorize the web site using a Bayesian classifier or other classification engine.

Automatic Categorization with Scripted Guidance from the Advertiser

The two preceding methods provide automatic systems for categorizing an advertiser's web site. However, with all artificial intelligence systems there may be some end results would not fully make sense to a human. Thus, it might be desirable to have some limited human guidance to act as a check on the automated systems. Furthermore, the human could, add additional insight that could not be generated by an artificial intelligence system.

Figure 4:
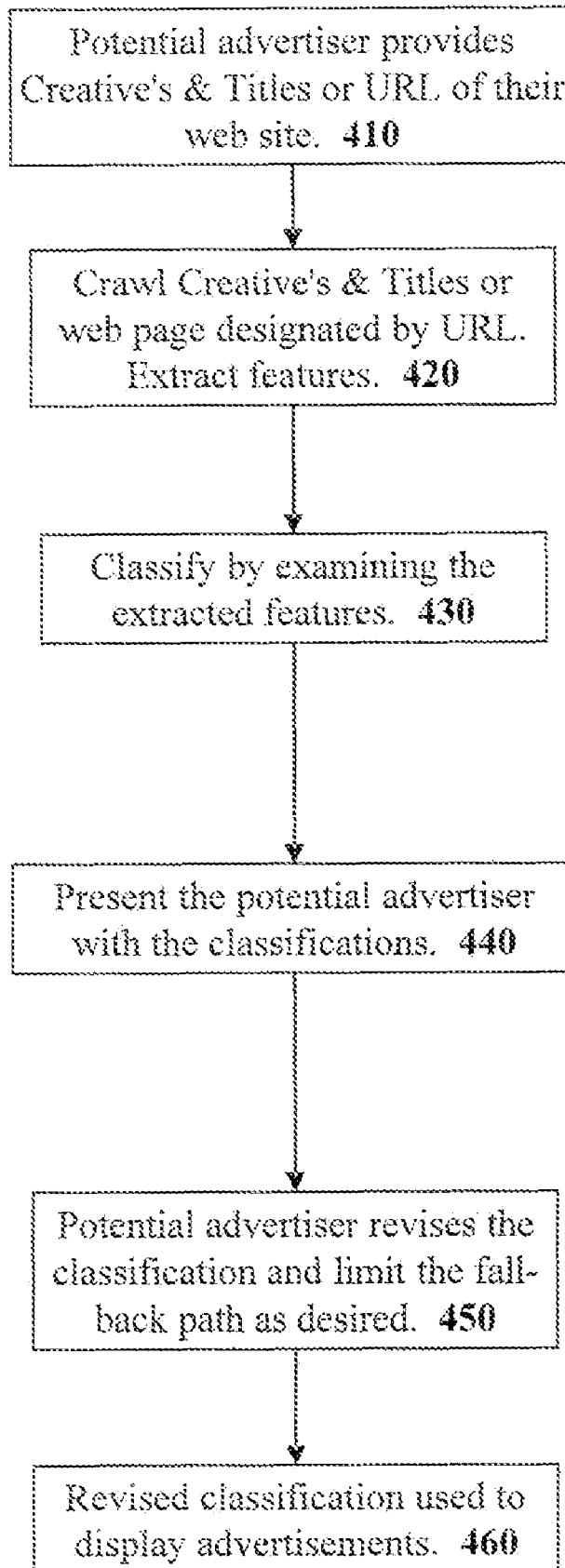
FIG. 4 illustrates a high-level flow diagram of one method of incorporating the knowledge of a human to compliment the automatic classification of internet advertisements.

FIG. 4 illustrates one possible method of incorporating the knowledge of a human to compliment an automatic classification. Referring to step 410, an advertiser provides the "Creatives & Titles" from existing advertisements or the URL of their web site to the advertising service. The advertising service then has software extract salient features from the Creatives & Titles or the advertiser's web site at step 420. Web site crawling engines and linguistic analysis programs for performing such tasks are well known in the art.

Then a classification engine classifies the advertiser's Creatives & Titles or web site at step 430. This may be performed by a Bayesian classifier or other such artificial intelligence based, classification engine. Although classification engines have become very sophisticated, such engines can still make mistakes or make inferences conclusions that no human would make. Thus, at step 440, the automatic classification is presented to human (such as the advertiser).

Figure 5A:
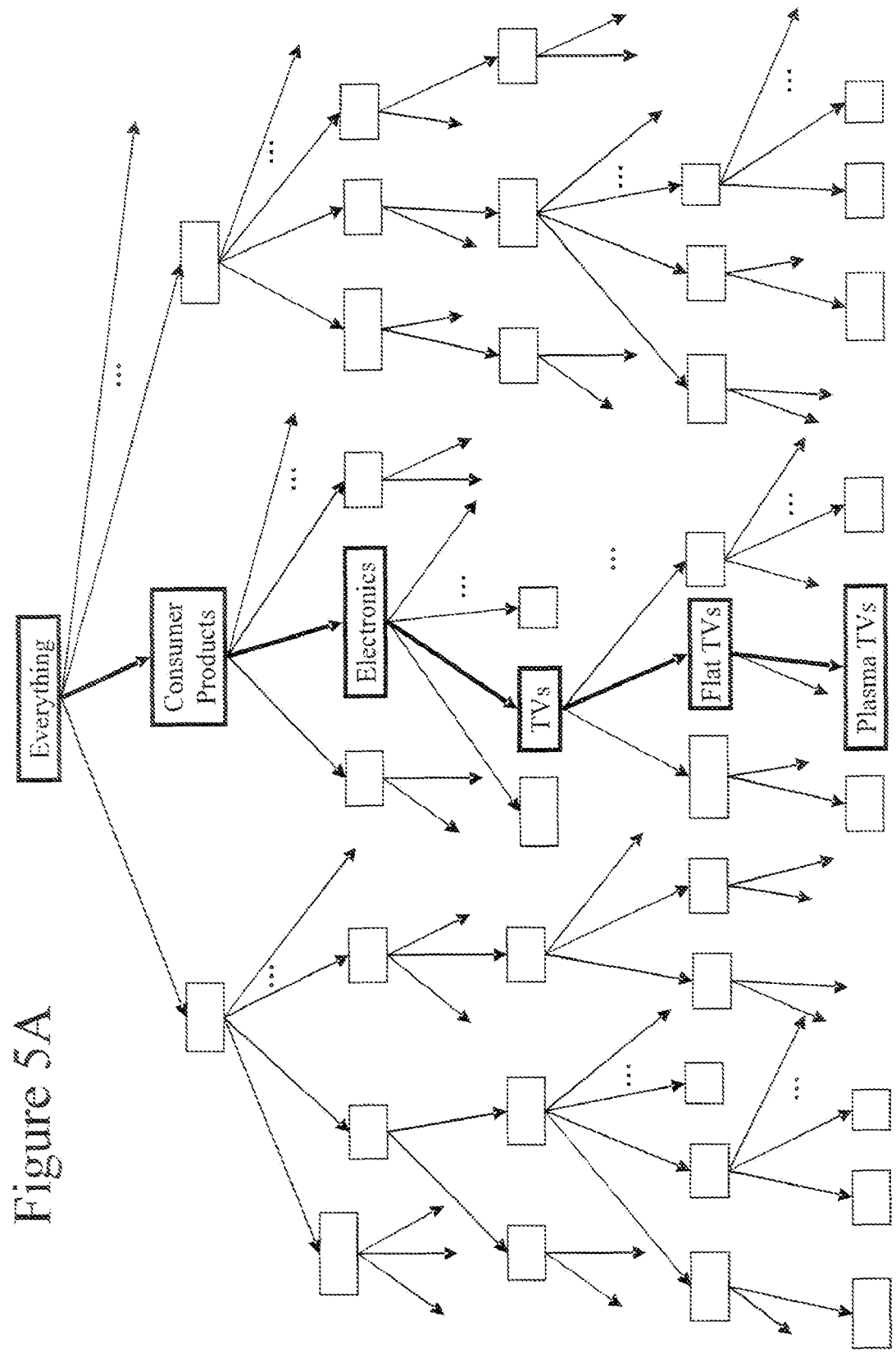
FIG. 5A illustrates a portion of a category hierarchy with the plasma TV category node and a fall-back path all the way back to the root node high-lighted.

In one embodiment, the human is presented with a graphical representation of the categorization that has been made. For example. FIG. 5A illustrates one example of a classification that has been made after crawling and classifying a plasma television retailer's web site. The classification is presented with the target classification node (plasma TVs) highlighted along with the fall-back path back to the root node.

Figure 5B:
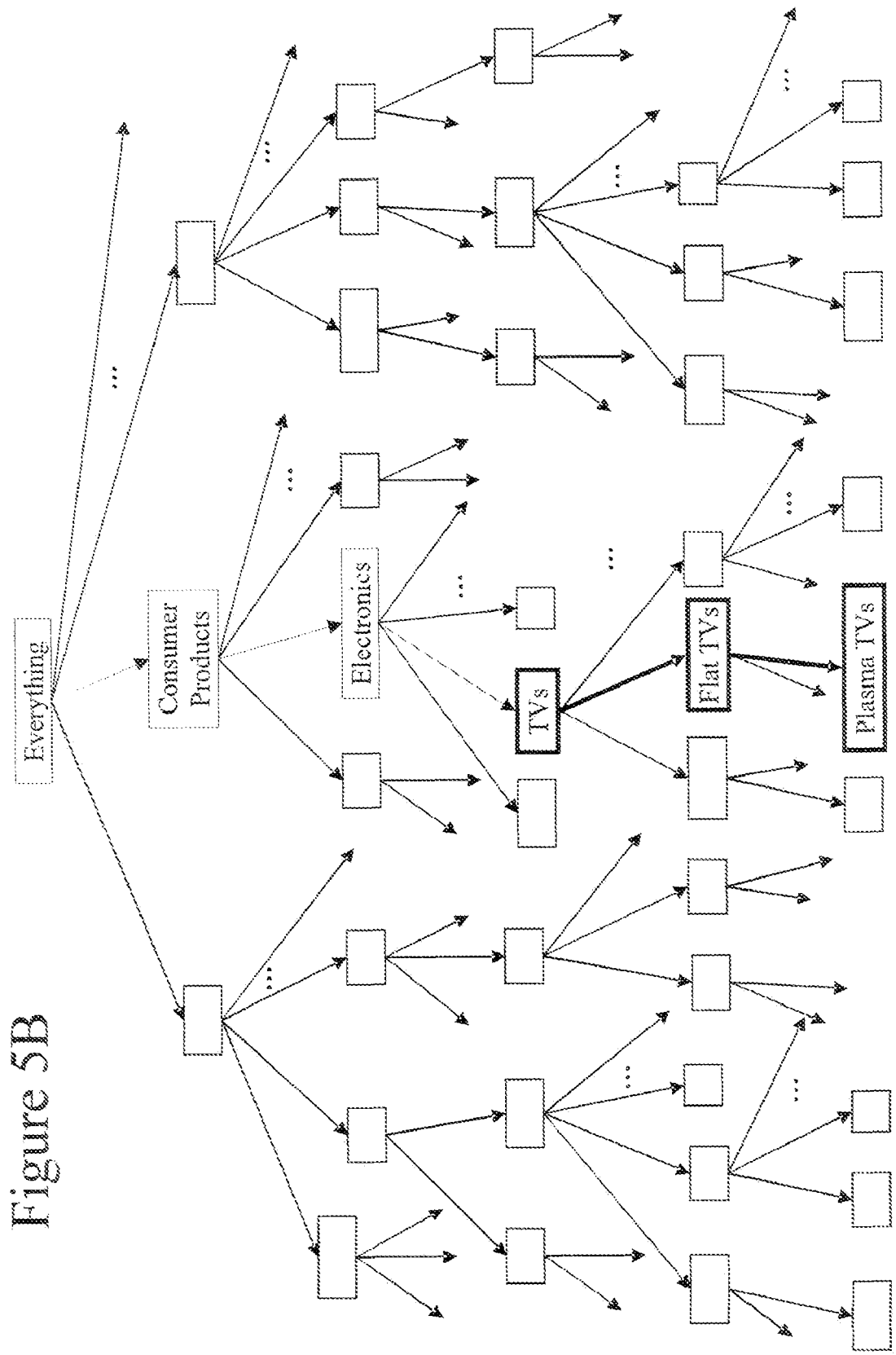
FIG. 5B illustrates the category hierarchy of FIG. 5A with the fall-back path limited to stop at the 'televisions' category node.

Referring back to FIG. 4, the next step is to have the advertiser revise the automatic classification and limit the fell-back paths as desired. If any bad misclassifications have occurred, the human could remove those misclassifications. As set forth earlier, our hypothetical plasma television retailer could limit the fall-back such that the broadest acceptable classification would be the televisions node. FIG. 5B illustrates the classification after the plasma television retailer limited the fall-back path in that manner. In a preferred embodiment, these changes are made using a graphical user interface as is well known in the art.

Figure 5C:
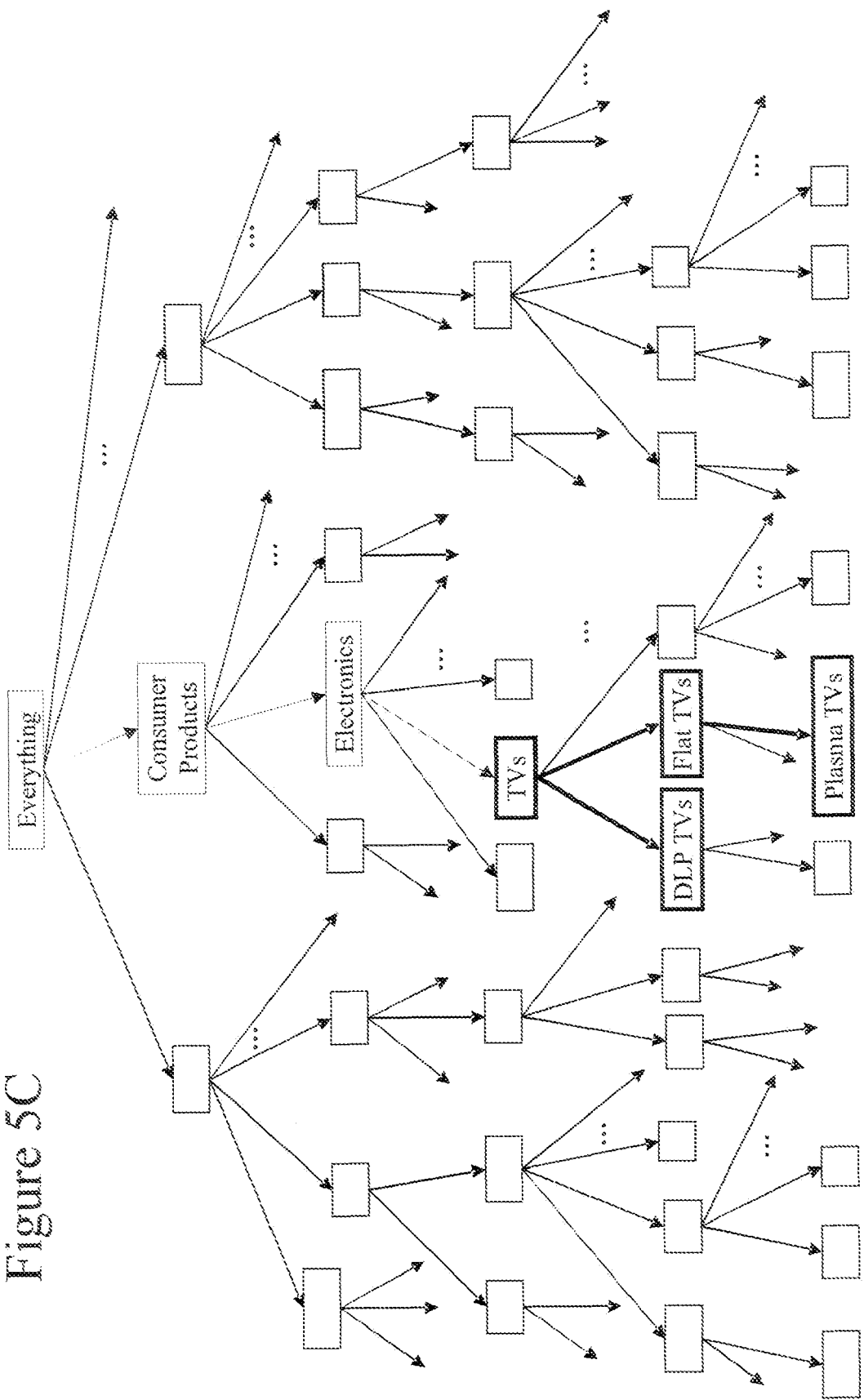
FIG. 5C illustrates the category hierarchy of FIG. 5B with the addition of 'DLP TVs' as a desired target category node.

The advertiser could also make other changes that reflect the advertiser's knowledge of his own business. For example, the plasma television retailer may feel that consumers interested in DLP televisions are often also interested in plasma televisions and often end up purchasing a plasma television. Thus, the plasma television retailer may decide to make a DLP television category node as a desired category. The final classification choice is illustrated in FIG. 5C.

After the advertiser has completed his desired changes, the revised classification is returned to the advertising service. The revised classifications are then used to display the advertiser's advertisements.

Wide Usage of Category-Based Internet Advertisements

As set forth in the earlier section on the creation of category-based internet advertisements, a key goal is to simplify matters for potential advertisers. Currently, advertisers must decide where their advertisements should be placed on the internet. For example, advertisements may be placed on web sites dedicated to particular topics, within advertisement supported applications such as email, as results for search engine queries, or in many other areas. Advertisers shouldn't be concerned with where in the thousands of different places than an advertisement may appear. The advertiser is primarily concerned with having its advertisements viewed by people interested in its goods or services.

The hierarchical category based internet advertising system achieves this goal by allowing the advertiser to associated one or more specific interest categories within the category hierarchy. Thus, a tire store can simply specify that its advertisements be displayed in any context concerned with the category of tires. No additional information about how to place the advertisement is required from the advertiser.

With such a categorization, a global advertisement pool of categorized advertisements can be used to supply advertisements to any internet advertisement space. Using the global advertisement pool will provide higher advertisement coverage and better advertisement relevance than the existing fragmented system since there will be much larger source of potentially relevant advertisements to choose from for every available advertisement location.

In a pay-per-click system, an advertisement that has been displayed but not clicked on by a user should be 'returned back' to the global pool and may be selected next time for the same category. An advertisement that has been clicked on as many times as there were funds (clicks) allocated for it by the advertiser will be considered used and should be removed from the global advertisement pool.

Some advertisers may have specific concerns about where their advertisements will appear. To address these particular concerns about where their advertisements appear, an option may be given allowing advertisers to specify where their advertisements are not allowed to appear. However, such specifications are optional and by default the internet advertisements should be allowed to appear in any location with advertisement placement guided by the desired category.

As set forth above, any available area for internet advertisement placement must be assigned a category in order to select a relevant advertisement. As it turns out, there are good methods of determining a proper category for just about every area where an internet advertisement may be placed. The following sub sections will describe some of the methods that may be used to assign a category to a place where an internet advertisement may be placed.

Hierarchical Directory Categorization

Some Interact directories already use a hierarchical organization. For example, the internet pioneer Yahoo! originally started as a hierarchical directory. In fact name "Yahoo" partly originated as an acronym for "Yet Another Hierarchical Officious Oracle". With such internet hierarchical directories, the hierarchical directory itself can be used to categorize the various pages when the hierarchical directory matches the advertising category hierarchy.

Search Engine Web Page Categorization

Internet search engines allow web viewers to type in a few keywords in order to locate a relevant web page or web site. One can categorize web pages associated with internet search engines in various different manners.

A first method is to examine the keywords that a user types into a search engine and use those keywords to identify a categorization for subsequent web page containing search results. A Bayesian classifier may be used to perform this task.

An alternate method is to perform the search and then use the results of the search to categorize the results page. Specifically, the internet search results will generally include some titles & abstracts that can be used to classify the results page.

Yet another method of assigning a categorization, to the search results page is to perform the search and then crawl the web pages contained in search results. A categorization of the web pages contained in the search results could then be used for the search results page.

Commercial Content Web Page Categorization

Various different newspapers, magazines, and journals have web sites that offer an online version of their publications. A Bayesian classification system could easily crawl such web pages and generate classifications for the various web pages in such web sites. This would be performed in the same manner as the automatic classification of a potential advertiser by crawling and classifying that potential advertiser's web site.

Message Board Categorization

Internet discussion message boards are created for every topic possible. A categorization for an internet message board pages could be assigned by using a hybrid of the message board topic and classifications based on individual web pages from the message board.

In one embodiment, the message board topic could be used to guide the classification while classifications of web pages would refine that classification. For example, there may be a message board dedicated to automobile repair. This message board topic would generally logically lead to discussions of automobiles and tools. An automatic classification of a particular web page could then lead to a refined classification within such categories such as clutch parts, automobile lubricants, vehicle timer adjustment tools, etc.

Internet Application Categorization

There are many internet applications that are partially or completely subsidized by advertisements. For example, internet telephony applications, internet messaging applications, online parlor games, driving route generators, and other applications can be accessed on the internet and used. The selection of advertisement categories can be guided by the application type and any in application data available.

For example, internet messaging applications are often used by distant friends to communicate with each other. Such an Internet application may desire advertisements in airline travel or long distance telephony categories. Furthermore, the text discussed by the users may be examined to determine additional relevant categories. For example, if the participants of messaging discussion are discussing recent movie releases then a category of movies may be used to identify advertisements.

Similarly, an internet online game service may initially select categories such as online videogames or categories associated with the demographics of the people that enjoy that particular online game. If the game includes a messaging component that allows the game participants to chat with each other, that in game discussion could be used to identify additional categories.

Various Market Systems Selling for Category-Based Advertisements

With the current keyword based advertising systems, keyword auctions are often used to allow the advertising service to get the best prices for their advertising inventory. However, as set forth in the background, internet advertisers have learned to game and manipulate such keyword auctions. For example, advertisers have learned to bid on synonyms and common misspellings of popular keywords in order to fragment the auction market to get cheaper advertising. Furthermore, internet advertisers have learned to bid on very obscure keywords in order to obtain very inexpensive advertising slots.

Auction techniques can be used in conjunction with the hierarchical category based advertising system, of the present invention. The hierarchical category based system prevents the auction manipulation present in keyword-based auctions since the auction market is more limited in that there are a much smaller number of categories than there are possible keywords. For example, instead of having many possible keywords that may all be related to the same market such as 'tire', 'tyre', 'tires', 'wheels', 'Goodyear', 'Goodrich', 'flat', 'Bridgestone', 'Michelin', etc., all of the tire retailers would have to bid on a single 'automobile tires' category.

Since more specific categorizations should result in higher conversion rates (sales), it would be expected that the more specific categories should obtain higher prices. For example, referring to FIG. 3A one would expect that the plasma TVs 346 category node to obtain a higher price than the flat panel TVs 337 category node since the improved relevance should result in a higher conversion rate.

However, it may not always be true that more specific categories will obtain higher prices. This must be taken into consideration, when fall-back advertisements are selected for display. When an advertisement slot for a particular category becomes available and there is no perfect match, an advertisement from a more specific category may be placed in that available slot. Specifically, an advertisement that has the broader category in its fall-back path will be selected. In such a case, the advertiser should be charged no more than the price the advertiser paid for the specific desired category node. For example, referring to FIG. 3A, if a plasma television retailer designated the flat panel TVs 337 category node as the desired category node and the retailer's advertisement is displayed in a televisions 323 category slot, then the retailer should pay no more than what that the retailer bid for the flat panel TVs 337 category node (even if the televisions 323 category currently has a higher price).

The preference is given to the exact matching category advertisements, but an advertiser who bid on more specific sub categories will also be able to use the fall-back path to get their advertisements displayed on the broader (parent) category pages. So the choice between coverage and relevance is market and advertiser driven. And thus use of an auction system will provide a flexible market driven system that will provide the fair pricing for each category.

The foregoing has described a number of techniques for categorizing and displaying electronic advertisements. It is contemplated that changes and modifications may be made by one of ordinary skill, in the art, to the materials and arrangements of elements of the present invention without departing from the scope of the invention.

We claim:

1. A computer-implemented method of organizing and displaying electronic advertisements comprising:
assigning, in a computer, a plurality of electronic advertisements to a plurality of category nodes within a category hierarchy, wherein:
said category hierarchy comprises a plurality of levels of said category nodes,
said category nodes include a plurality of ancestor category nodes associated with
a plurality of descendant category nodes and identified by a number of
levels separating the ancestor category nodes from the associated
descendant category nodes;
assigning, in a computer, a plurality of available advertisement slots to said plurality of
category nodes within said category hierarchy; and
selecting, in a computer:
for each electronic advertisement assigned to a particular category node, an
available advertisement slot assigned to a matching particular category
node, if said available advertising slot assigned to a matching particular
category node exists, if said available advertising slot assigned to a matching particular category node
does not exist, then selecting, in a computer, for the electronic
advertisement assigned to a particular category node, an available
advertising slot assigned to an ancestor category node associated with said
particular category node, wherein the ancestor category node is separated
from said matching particular category node by less than a predetermined
number of levels.

2. The computer-implemented method of organizing and displaying electronic advertisements as set forth in claim 1 wherein said electronic advertisements are internet advertisements.

3. The computer-implemented method of organizing and displaying electronic advertisements as set forth in claim 1 wherein advertisers bid for categories in said category hierarchy using an auction system.

4. The computer-implemented method of organizing and displaying electronic advertisements as set forth in claim 1 wherein when an advertiser has a particular advertisement displayed in an available advertising slot assigned to an ancestor category node associated with said particular category node then said advertiser pays no more than a price agreed upon for a target category node for said particular advertisement.

5. The computer-implemented method of organizing and displaying electronic advertisements as set forth in claim 1 wherein each said electronic advertisements specify particular advertisement locations that may not be used to display said electronic advertisement.

6. A computer readable medium, said computer readable medium comprising a set of instructions for organizing and displaying electronic advertisements, said set of instructions performing the steps of:
assigning, in a computer, a plurality of electronic advertisements to a plurality of category nodes within a category hierarchy, wherein:
said category hierarchy comprises a plurality of levels of said category nodes,
said category nodes include a plurality of ancestor category nodes associated with a plurality of descendant category nodes and identified by a number of levels separating the ancestor category nodes from the associated descendant category nodes;
assigning, in a computer, a plurality of available advertisement slots to said plurality of category nodes within said category hierarchy; and
selecting, in a computer:
for each electronic advertisement assigned to a particular category node, an available advertisement slot assigned to a matching particular category node, if said available advertising slot assigned to a matching particular category node exists,
if said available advertising slot assigned to a matching particular category node does not exist, then selecting, in a computer, for the electronic advertisement assigned to a particular category node, an available advertising slot assigned to an ancestor category node associated with said particular category node, wherein the ancestor category node is separated from said matching particular category node by less than a predetermined number of levels.

7. The computer readable medium as set forth in claim 6 wherein said electronic advertisements are internet advertisements.

8. The computer readable medium as set forth in claim 6 wherein advertisers bid for categories in said category hierarchy using an auction system.

9. The computer readable medium as set forth in claim 6 wherein when an advertiser has a particular advertisement displayed in an available advertising slot assigned to an ancestor category node associated with said particular category node then said advertiser pays no more than a price agreed upon for a target category node for said particular advertisement.

10. The computer readable medium as set forth in claim 6 wherein each said electronic advertisements specify particular advertisement locations that may not be used to display said electronic advertisement.

11. A computer-implemented hybrid method of categorizing electronic advertisements in a category hierarchy, said method comprising the steps of:
examining, in a computer, information about an electronic advertisement with a classification engine, said classification engine assigning a first pass categorization of said electronic advertisement, wherein said first pass categorization comprises identification of a matching category node within a plurality of levels of category nodes, said plurality of levels of category nodes including a plurality of ancestor category nodes associated with a plurality of descendant category nodes and identified by a number of levels separating the ancestor category nodes from the associated descendant category nodes;
displaying, on a computer display, said first past categorization of said electronic advertisement to a human in a form of said category hierarchy displayed with said first pass categorization high-lighted; and
accepting, at a computer, changes to said first pass categorization by said human to said displayed category hierarchy, wherein said changes comprise identifying a maximum number of levels between an acceptable ancestor category node and said matching category node.

12. The computer-implemented hybrid method of categorizing electronic advertisements in a category hierarchy as set forth in claim 11 wherein said first past categorization further comprises suggesting a maximum number of levels.

13. The computer-implemented hybrid method of categorizing electronic advertisements in a category hierarchy as set forth in claim 12 wherein said changes to said first pass categorization by said human comprise an addition of a category node.

14. The computer-implemented hybrid method of categorizing electronic advertisements in a category hierarchy as set forth in claim 11 wherein said information about said electronic advertisement comprises a web site of an advertiser.

15. The computer-implemented hybrid method of categorizing electronic advertisements in a category hierarchy as set forth in claim 11 wherein said information about said electronic advertisement comprises text information from an existing electronic advertisement.

* * * * *